US010519295B2

(12) United States Patent
Asanuma

(10) Patent No.: US 10,519,295 B2
(45) Date of Patent: Dec. 31, 2019

(54) COMPOSITION HAVING EXCELLENT TRANSPARENCY

(71) Applicant: KURARAY CO., LTD., Kurashiki-shi (JP)

(72) Inventor: Yoshiaki Asanuma, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 160 days.

(21) Appl. No.: 14/779,256

(22) PCT Filed: Mar. 22, 2013

(86) PCT No.: PCT/JP2013/058439
§ 371 (c)(1),
(2) Date: Sep. 22, 2015

(87) PCT Pub. No.: WO2014/147841
PCT Pub. Date: Sep. 25, 2014

(65) Prior Publication Data
US 2016/0046783 A1 Feb. 18, 2016

(51) Int. Cl.
*C08L 29/14* (2006.01)
*C08K 5/10* (2006.01)
*C08K 5/06* (2006.01)
*C08L 71/02* (2006.01)
*B32B 17/06* (2006.01)
*B32B 27/06* (2006.01)
*B32B 27/30* (2006.01)
*C08L 29/04* (2006.01)
*B32B 17/10* (2006.01)

(52) U.S. Cl.
CPC .............. *C08K 5/10* (2013.01); *B32B 17/064* (2013.01); *B32B 17/10605* (2013.01); *B32B 17/10761* (2013.01); *B32B 27/06* (2013.01); *B32B 27/306* (2013.01); *C08K 5/06* (2013.01); *C08L 29/04* (2013.01); *C08L 29/14* (2013.01); *C08L 71/02* (2013.01); *B32B 2250/02* (2013.01); *B32B 2307/412* (2013.01); *C08L 2201/10* (2013.01); *C08L 2205/025* (2013.01); *C08L 2205/03* (2013.01)

(58) Field of Classification Search
CPC ...... C08K 5/10; C08L 29/14; C08L 2205/025
See application file for complete search history.

(56) References Cited

U.S. PATENT DOCUMENTS

| | | | | |
|---|---|---|---|---|
| 2,637,706 A * | 5/1953 | Bergstedt | ............... | C09J 129/14 524/310 |
| 4,574,136 A | 3/1986 | Gomez | | |
| 4,604,253 A | 8/1986 | Gomez | | |
| 5,770,654 A | 6/1998 | Blatz | | |
| 2008/0064775 A1 * | 3/2008 | Wheeler | ................. | C08J 9/103 521/83 |
| 2010/0068513 A1 * | 3/2010 | Kikuchi | ............. | C08G 18/0809 428/341 |
| 2011/0049434 A1 * | 3/2011 | Ootsuki | .................. | C04B 35/04 252/500 |
| 2012/0021231 A1 | 1/2012 | Hirota et al. | | |
| 2012/0202070 A1 * | 8/2012 | Asanuma | .......... | B32B 17/10761 428/412 |
| 2012/0288722 A1 | 11/2012 | Iwamoto et al. | | |
| 2013/0225741 A1 * | 8/2013 | Ootsuki | ................. | C09D 11/00 524/379 |
| 2014/0227489 A1 * | 8/2014 | Inui | ......................... | C08L 29/14 428/172 |
| 2014/0363651 A1 * | 12/2014 | Lu | ............................. | B32B 7/02 428/217 |
| 2016/0053102 A1 * | 2/2016 | Asanuma | ................. | C08L 29/14 428/437 |
| 2016/0271911 A1 * | 9/2016 | Kusudou | ................. | C08L 29/14 |

FOREIGN PATENT DOCUMENTS

| | | |
|---|---|---|
| EP | 0 133 611 A2 | 2/1985 |
| EP | 0 133 848 A1 | 3/1985 |
| GB | 546746 | 7/1942 |
| JP | 5 4841 | 1/1993 |
| JP | 6-191905 A | 7/1994 |
| JP | 7-10924 A | 1/1995 |
| JP | 8-48567 A | 2/1996 |
| JP | 9 506377 | 6/1997 |

(Continued)

OTHER PUBLICATIONS

Office Action dated Oct. 28, 2013 in Japanese Patent Application No. 2013-515622 (with English language translation).
Office Action dated Apr. 11, 2014 in Japanese Patent Application No. 2013-515622 (with English language translation).
Extended European Search Report dated Oct. 13, 2016 in Patent Application No. 13878613.2.
U.S. Appl. No. 14/779,256, filed Sep. 22, 2015, Asanuma.
U.S. Appl. No. 14/779,179, filed Sep. 22, 2015 Asanuma, et al.
U.S. Appl. No. 14/779,220, filed Sep. 22, 2015 Asanuma, et al.
International Search Report dated Jun. 25, 2013 in PCT/JP2013/058439 filed Mar. 22, 2013.

*Primary Examiner* — Nicholas E Hill
(74) *Attorney, Agent, or Firm* — Oblon, McClelland, Maier & Neustadt, L.L.P.

(57) ABSTRACT

To provide a laminated product of a layer including a polyvinyl acetal and a layer including a hydrocarbon-based polymer, having excellent adhesion between the layers.

A composition including, with respect to 100 parts by mass of a polyvinyl acetal satisfying definition 1 and/or definition 2, 30 to 70 parts by mass of a plasticizer including 0.5 to 100% by mass of a plasticizer containing a polar group and 0 to 99.5% of a plasticizer containing no polar group.

Definition 1: When 1 g of a polyvinyl acetal is dissolved in 100 g of methanol, an undissolved content is 2.5 to 90% by mass.

Definition 2: When 1 g of a polyvinyl acetal is dissolved in 100 g of chloroform, an undissolved content is 5 to 70% by mass.

21 Claims, No Drawings

(56) References Cited

FOREIGN PATENT DOCUMENTS

| JP | 10-25390 A | 1/1998 | |
|---|---|---|---|
| JP | 2001-89245 A | 4/2001 | |
| JP | 2001 220184 | 8/2001 | |
| JP | WO 2010146107 A1 * | 12/2010 | ....... B32B 17/10688 |
| JP | WO 2011016495 A1 * | 2/2011 | ....... B32B 17/10761 |
| JP | 2011 084468 | 4/2011 | |
| JP | 2011 144084 | 7/2011 | |
| JP | 2011 225449 | 11/2011 | |
| JP | 2012 1397 | 1/2012 | |
| JP | WO 2012043273 A1 * | 4/2012 | ............. C09D 11/00 |
| JP | 5465812 B1 * | 4/2014 | ............. C08K 5/103 |
| JP | 5469279 B1 * | 4/2014 | ............. B32B 27/22 |
| JP | WO 2014188542 A1 * | 11/2014 | ............. B32B 27/22 |
| JP | WO 2014188543 A1 * | 11/2014 | ............. C08K 5/103 |
| WO | WO 2008/143195 A1 | 11/2008 | |
| WO | 2011 016495 | 2/2011 | |
| WO | 2013 031629 | 3/2013 | |
| WO | WO-2013031884 A1 * | 3/2013 | ............. C08L 29/14 |

* cited by examiner

COMPOSITION HAVING EXCELLENT TRANSPARENCY

TECHNICAL FIELD

The present invention relates to a composition including a polyvinyl acetal, a sheet thereof, and an application thereof.

BACKGROUND ART

A polyvinyl acetal represented by polyvinyl butyral has excellent adhesion and compatibility with various organic and inorganic substrates, and has excellent solubility in an organic solvent. The polyvinyl acetal is widely used as various adhesives, a binder for ceramics, various inks, paints, and the like, or an interlayer film for safety glass.

Recently, in an application of an interlayer film for laminated glass, various highly functionalized products have been developed. For example, a laminated sound insulation interlayer film for laminated glass is disclosed (for example, refer to Patent Documents 1 and 2). In the laminated sound insulation interlayer film for laminated glass, in order to impart high sound insulating properties to the interlayer film for laminated glass, a plurality of polyvinyl acetal layers having different compositions is laminated. For example, the polyvinyl acetal layers have different content ratios of a polyvinyl acetal and a plasticizer. In the interlayer film for laminated glass, in general, in order to make amounts of a plasticizer included in the respective layers different from each other, polyvinyl acetals having different average amounts of remaining hydroxyl groups between the respective layers are used.

By the way, in general, an interlayer film for laminated glass is manufactured using an extruder from a viewpoint of production costs thereof. The laminated sound insulation multilayer interlayer film for laminated glass is manufactured by a coextrusion method. However, when the interlayer film for laminated glass is manufactured by this method, a trim or an off-spec product which cannot be a commercial product because of nonuniform composition or thickness is obtained.

In general, such a trim or an off-spec product can be recycled by melt kneading and extrusion molding. However, when a mixture of polyvinyl acetal compositions having different compositions as a trim or an off-spec product is used, a resulting interlayer film for laminated glass may be opaque. In particular, in the laminated sound insulation interlayer film for laminated glass, the polyvinyl acetal compositions included in the respective layers include polyvinyl acetals having different average amounts of remaining hydroxyl groups from each other. Therefore, it is difficult to make the polyvinyl acetals compatible with each other. The interlayer film for laminated glass obtained by recycling the trim or the off-spec product generated during manufacturing the interlayer film for laminated glass has a problem of poor transparency.

When a polyvinyl acetal resin is manufactured, a batch type precipitation method has been industrially and widely performed.

In a typical batch type precipitation method, polyvinyl alcohol as a raw material of the polyvinyl acetal resin is dissolved in water. An aldehyde such as butylaldehyde, and an acid catalyst such as hydrochloric acid or nitric acid are added thereto to initiate an acetalization reaction. When an acetalization degree reaches a certain level, partially acetalized polyvinyl alcohol which cannot be dissolved in water precipitates to become particles. Thereafter, the acetalization reaction proceeds in a heterogeneous system in which the particles are dispersed in water. After completion of the reaction, the acid catalyst is appropriately neutralized, washed, and dried to obtain a polyvinyl acetal.

A resin obtained by the batch type precipitation method is preferable because the resin is obtained in a form of particles, and excellent in purifying the resulting resin by washing with water and in handling the resin after drying. Meanwhile, because of the batch reaction, even when production conditions are the same, average acetalization degrees of the polyvinyl acetals obtained for batches may vary between the batches (that is, an average amount of remaining hydroxyl groups (mol %) may be different). Because of such a variation between the batches, when two or more kinds of polyvinyl acetals having average acetalization degrees different from each other by a certain degree or more are mixed with a plasticizer generally used for a polyvinyl acetal, such as triethylene glycol di-2-ethylhexanoate (3GO), to be used, transparency of a resulting composition may be lowered.

As described above, the acetalization reaction after particle precipitation proceeds in a heterogeneous system. Therefore, in some reaction methods, a polyvinyl acetal (a polyvinyl acetal having a large variation in a batch) having a relatively wide distribution of the acetalization degree even in the same batch (that is, variation of an amount of the remaining hydroxyl groups (mol %) in a batch is large) may be obtained. Particularly, when the acetalization reaction is performed in such a reaction condition as to increase a particle diameter of a polyvinyl acetal, there is a difference in an aldehyde concentration and an acid catalyst concentration between the inside and the outside of the particles during the reaction. Therefore, a polyvinyl acetal having a relatively wide distribution of the acetalization degree even in the same batch tends to be obtained. When the polyvinyl acetal having a relatively wide distribution of the acetalization degree even in the same batch is mixed with 3GO, transparency of a resulting composition may be lowered. Particularly, laminated glass including, as an interlayer film, a sheet made from a composition may be clouded under irradiation with light, the composition being obtained by mixing the polyvinyl acetal having a relatively wide distribution of the acetalization degree even in the same batch and a plasticizer generally used for a polyvinyl acetal, such as 3GO. An application thereof in exposure to strong light, for example, an application thereof to a windshield of a car (exposed to a headlight from an oncoming car during driving at night) is difficult.

CITATION LIST

Patent Literature

Patent Literature 1: JP 2011-225449 A
Patent Literature 2: JP 2011-084468 A

SUMMARY OF INVENTION

Technical Problem

The present invention solves the above-described problems. An object of the present invention is to provide a composition including polyvinyl acetals having different average amounts of remaining hydroxyl groups and being able to mold a sheet having excellent transparency.

Solution to Problem

According to the present invention, the above-described object can be achieved by providing a composition including, with respect to 100 parts by mass of a polyvinyl acetal satisfying the following definition 1 and/or definition 2, 30 to 70 parts by mass of a plasticizer including 0.5 to 100% by mass of a plasticizer containing a polar group and 0 to 99.5% by mass of a plasticizer containing no polar group, a total of the plasticizer containing a polar group and the plasticizer containing no polar group being 100% by mass.

Definition 1: When 1 g of a polyvinyl acetal is dissolved in 100 g of methanol, an undissolved content is 2.5 to 90% by mass.

Definition 2: When 1 g of a polyvinyl acetal is dissolved in 100 g of chloroform, an undissolved content is 5 to 70% by mass.

A preferable polyvinyl acetal is as follows. That is, when a solution obtained by dissolving 1 g of the polyvinyl acetal in 100 g of ethanol is titrated with hexane, a dropping amount of hexane until the solution becomes clouded is preferably 150 mL or more.

A preferable polyvinyl acetal is as follows. That is, when the solution obtained by dissolving 1 g of the polyvinyl acetal in 100 g of ethanol is titrated with deionized water, a dropping amount of deionized water until the solution becomes clouded is preferably 15 mL or more.

The plasticizer containing a polar group is preferably a compound containing a hydroxyl group.

The compound containing a hydroxyl group preferably has a molecular weight of 200 to 2000.

The compound containing a hydroxyl group preferably has a number average molecular weight based on a hydroxyl value of 200 to 2000.

The compound containing a hydroxyl group is preferably an ester compound containing a hydroxyl group.

The ester compound containing a hydroxyl group is preferably a polyester compound containing a hydroxyl group.

The compound containing a hydroxyl group is preferably an ether compound containing a hydroxyl group.

The ether compound containing a hydroxyl group is preferably a polyether compound containing a hydroxyl group.

The plasticizer preferably includes a compound containing a hydroxyl group in an amount of 0.5 to 5% by mass, and a diester compound of a monovalent carboxylic acid and at least one compound selected from triethylene glycol and tetraethylene glycol, containing no polar group, in an amount of 70 to 99.5% by mass.

The polyvinyl acetal is preferably a mixture of polyvinyl acetal (A) and polyvinyl acetal (B) having different average amounts of remaining hydroxyl groups.

When the average amount of remaining hydroxyl groups of polyvinyl acetal (A) is X mol % and the average amount of remaining hydroxyl groups of polyvinyl acetal (B) is Y mol %, preferably $|X-Y| \geq 1$.

Preferably, $X=27.0$ to $33.0$, $Y=15.0$ to $27.0$, and the polyvinyl acetal satisfies definition 1.

Preferably, $X=27.0$ to $33.0$, $Y=33.0$ to $50.0$, and the polyvinyl acetal satisfies definition 2.

Preferably, $X=15.0$ to $27.0$, $Y=33.0$ to $50.0$, and the polyvinyl acetal satisfies definitions 1 and 2.

The mixing ratio of polyvinyl acetal (A) and polyvinyl acetal (B) is preferably 20:80 to 98:2 (mass ratio).

The average amount of remaining hydroxyl groups of the polyvinyl acetal is preferably 15 to 33 mol %.

The present invention relates to a sheet made from the above-described composition.

The present invention relates to laminated glass including the above-described sheet.

The present invention relates to laminated glass having haze of 0.01 to 2%.

Advantageous Effects of Invention

The composition of the present invention includes the polyvinyl acetal satisfying definition 1 and/or definition 2 as an essential component. The polyvinyl acetal satisfying definition 1 has a small amount of remaining hydroxyl groups, and therefore, includes a specific amount of polyvinyl acetal molecules to be hardly dissolved in methanol and a specific amount of polyvinyl acetal molecules to be dissolved in methanol. The polyvinyl acetal satisfying definition 2 has a large amount of remaining hydroxyl groups, and therefore, includes a specific amount of polyvinyl acetal molecules to be hardly dissolved in chloroform and a specific amount of polyvinyl acetal molecules to be dissolved in chloroform. As described above, when the polyvinyl acetal including polyvinyl acetal molecules having different amounts of remaining hydroxyl groups is mixed particularly with a plasticizer generally used for a polyvinyl acetal, such as triethylene glycol di-2-ethylhexanoate (3GO), transparency of a resulting composition may be poor. The composition of the present invention includes, as an essential component, a plasticizer including 0.5 to 100% by mass of a plasticizer containing a polar group. It is estimated that the plasticizer containing a polar group can make polyvinyl acetal molecules having different amounts of remaining hydroxyl groups compatible with each other or can disperse the polyvinyl acetal molecules microscopically to a level having no influence on transparency. A transparent composition is obtained. Therefore, the composition of the present invention has excellent transparency, even when particularly a trim generated in manufacturing a laminated interlayer film by extrusion molding, the polyvinyl acetal having a variation in the acetalization degree between the batches, or the polyvinyl acetal having a relatively wide distribution of the acetalization degree even in the same batch is used as a raw material. Therefore, it is possible to mold a sheet having excellent transparency.

DESCRIPTION OF EMBODIMENTS

First, a polyvinyl acetal used in the present invention will be explained. The polyvinyl acetal used in the present invention satisfies the following definition 1 and/or definition 2.

Definition 1: When 1 g of a polyvinyl acetal is dissolved in 100 g of methanol, an undissolved content is 2.5 to 90% by mass.

Definition 2: When 1 g of a polyvinyl acetal is dissolved in 100 g of chloroform, an undissolved content is 5 to 70% by mass.

In definition 1, the phrase "When 1 g of a polyvinyl acetal is dissolved in 100 g of methanol, an undissolved content is 2.5 to 90% by mass." means the following. That is, 1 g of a polyvinyl acetal having a major axis of each particle or each lump of 3 mm or less is added to 100 g of methanol such that the polyvinyl acetal does not become agglomerated while the methanol is stirred. After a treatment at 25° C. for 72 hours, a resulting solution (including an undissolved fragment) is subjected to filtration under reduced pressure at a differential pressure of $0.010 \pm 0.002$ MPa using filter paper classified into five A defined in JIS P3801. At this time, a dry weight of components remaining on the filter paper is 0.025 to 0.90 g (that is, 2.5 to 90% by mass). When 1 g of a polyvinyl acetal is dissolved in 100 g of methanol, the undissolved content is preferably 5 to 90% by mass, more preferably 10 to 90% by mass, still more preferably 70 to 90% by mass. When a polyvinyl acetal having the undissolved content of less than 2.5% by mass is used, such a problem to be solved by the present invention that a sheet having poor transparency and clouded when being used for laminated glass is obtained hardly occurs. However, in this range, a usable polyvinyl acetal is limited, and a recycling efficiency may be lowered. When a polyvinyl acetal having the undissolved content of larger than 90% by mass is used, such a problem to be solved by the present invention that a sheet having poor transparency and clouded when being used for laminated glass is obtained hardly occurs. However, this range limits a usable polyvinyl acetal, lowers a recycling efficiency, and is not preferable. When the major axis of each particle or each lump of the polyvinyl acetal used in the present invention is larger than 3 mm, the polyvinyl acetal is treated by such a method as not to change the composition thereof, for example, by cutting the particles or the lumps with scissors, and the polyvinyl acetal including a particle or a lump having a major axis of 3 mm or less may be used.

The above-described filtration of the solution (including an undissolved fragment) obtained by dissolving 1 g of a polyvinyl acetal in 100 g of methanol is performed in the following manner. A Buchner funnel is attached to a suction bottle of an appropriate size to set the filter paper thereto. Furthermore, the filter paper is impregnated with methanol in advance. The solution (including an undissolved fragment) is poured onto the filter paper and is subjected to suction filtration under reduced pressure using an aspirator or the like (differential pressure 0.010±0.002 MPa). When 95% or more of the poured solution is filtered, 100 mL of methanol is further poured onto the filter paper, and the undissolved fragment remaining on the filter paper is washed. When the filtrate stops coming out, a solid on the filter paper is collected. Methanol remaining in the solid is dried under reduced pressure (−0.095 to −0.097 MPa, room temperature, 24 hours). Thereafter, a weight is measured and a ratio (percentage) of the undissolved fragment is calculated. The ratio of the undissolved fragment is calculated by (weight of undissolved fragment [g]/weight of sample added to methanol [g])×100. The polyvinyl acetal satisfying definition 1 has a small amount of remaining hydroxyl groups, and therefore, includes a specific amount of polyvinyl acetal molecules to be hardly dissolved in methanol and a specific amount of polyvinyl acetal molecules to be dissolved in methanol.

In definition 2, the phrase "When 1 g of a polyvinyl acetal is dissolved in 100 g of chloroform, an undissolved content is 5 to 70% by mass." means the following. That is, in the above-described method of measuring the undissolved content when 1 g of a polyvinyl acetal is dissolved in 100 g of methanol in definition 1, the ratio of the undissolved fragment is 5 to 70% by mass when chloroform is used in place of methanol. The undissolved content in definition 2 is preferably 7 to 70% by mass, more preferably 10 to 70% by mass, still more preferably 20 to 70% by mass. When a polyvinyl acetal having the undissolved content of less than 5% by mass is used, such a problem to be solved by the present invention that a sheet having poor transparency and clouded when being used for laminated glass is obtained hardly occurs. In addition, a recycling efficiency may be lowered. When a polyvinyl acetal having the undissolved content of larger than 70% by mass is used, such a problem to be solved by the present invention that a sheet having poor transparency and clouded when being used for laminated glass is obtained hardly occurs, and a recycling efficiency may be lowered. The polyvinyl acetal satisfying definition 2 has a large amount of remaining hydroxyl groups, and therefore, includes a specific amount of polyvinyl acetal molecules to be hardly dissolved in chloroform and a specific amount of polyvinyl acetal molecules to be dissolved in chloroform.

The polyvinyl acetal used in the present invention is not particularly limited as long as the polyvinyl acetal satisfies definition 1 and/or definition 2. However, such a polyvinyl acetal as follows is preferably used. That is, when a solution obtained by dissolving 1 g of the polyvinyl acetal in 100 g of ethanol is titrated with hexane at 23° C., a dropping amount of hexane until the solution becomes clouded is preferably 150 mL or more, more preferably 160 mL or more, still more preferably 170 mL. When the dropping amount of hexane is less than 150 mL, the polyvinyl acetal includes polyvinyl acetal molecules having a low affinity with hexane (low-polarity solvent) and a significantly large amount of remaining hydroxyl groups. Therefore, the compatibility thereof with the plasticizer or the like used in the present invention tends to be lowered, and transparency of a sheet molded from a resulting composition tends to be poor.

In the composition of the present invention, such a polyvinyl acetal as follows is preferably used. That is, when a solution obtained by dissolving 1 g of the polyvinyl acetal in 100 g of ethanol is titrated with deionized water at 23° C., a dropping amount of deionized water until the solution becomes clouded is preferably 15 mL or more, more preferably 17 mL or more, still more preferably 20 mL or more, particularly preferably 25 mL or more. When the dropping amount of deionized water is less than 15 mL, the polyvinyl acetal includes polyvinyl acetal molecules having a low affinity with water (high-polarity solvent) and a significantly small amount of remaining hydroxyl groups. Therefore, the compatibility thereof with the plasticizer or the like used in the present invention tends to be lowered, and transparency of a sheet molded from a resulting composition tends to be poor.

The polyvinyl acetal used in the present invention can be prepared by various methods. For example, a polyvinyl acetal obtained by mixing polyvinyl acetal (A) and polyvinyl acetal (B) having different average amounts of remaining hydroxyl groups and satisfying definition 1 and/or definition 2, or a polyvinyl acetal having a relatively wide distribution of an acetalization degree even in the same batch and satisfying definition 1 and/or definition 2 can be used.

When a mixture of polyvinyl acetal (A) and polyvinyl acetal (B) having different average amounts of remaining hydroxyl groups is used as the polyvinyl acetal of the present invention, the polyvinyl acetal to be used is not particularly limited as long as the average amounts of remaining hydroxyl groups are different from each other, unless contrary to the gist of the present invention. From a viewpoint of achieving the object of the present invention to obtain a transparent composition and a sheet using the composition and having excellent transparency from a polyvinyl acetal which cannot obtain a transparent composition in combination with a general-purpose plasticizer, a polyvinyl acetal satisfying the following is particularly preferable. That is, when the amount of remaining hydroxyl groups of polyvinyl acetal (A) is X mol %, and the amount of remaining hydroxyl groups of polyvinyl acetal (B) is Y mol %, |X−Y|≥1, preferably |X−Y|≥3, more preferably |X−Y| is ≥5.

X and Y are not particularly limited unless contrary to the gist of the present invention. However, from viewpoints of availability, mechanical strength and moldability of the resulting composition, and the like, X=27.0 to 33.0, preferably 27.0 to 32.5, more preferably 27.0 to 32.0, Y=15.0 to 27.0, preferably 15.5 to 27.0, more preferably 16.0 to 27.0, and a polyvinyl acetal obtained by mixing polyvinyl acetal (A) and polyvinyl acetal (B) preferably satisfies definition 1, more preferably satisfies only definition 1. From similar viewpoints, X=27.0 to 33.0, preferably 27.5 to 33.0, more preferably 28.0 to 33.0, Y=33.0 to 50.0, preferably 33.0 to 45.0, more preferably 33.0 to 41.0, and a polyvinyl acetal obtained by mixing polyvinyl acetal (A) and polyvinyl acetal (B) preferably satisfies definition 2, more preferably satisfies only definition 2. From similar viewpoints, X=15.0 to 27.0, preferably 15.5 to 27.0, more preferably 16.0 to 27.0, Y=33.0 to 50.0, preferably 33.0 to 45.0, more preferably 33.0 to 41.0, and a polyvinyl acetal obtained by mixing polyvinyl acetal (A) and polyvinyl acetal (B) preferably satisfies definitions 1 and 2.

When a mixture of polyvinyl acetal (A) and polyvinyl acetal (B) is used as the polyvinyl acetal, a mixing ratio thereof is not particularly limited. However, the mixing ratio by mass of polyvinyl acetal (A) and polyvinyl acetal (B) may be 20:80 to 98:2, preferably 30:70 to 95:5, more preferably 50:50 to 90:10. By mixing polyvinyl acetal (A) and polyvinyl acetal (B) in such a ratio, a composition having excellent transparency is obtained, and a sheet having excellent transparency can be molded using the composition. Therefore, for example, it is possible to increase a recycling efficiency of the laminated interlayer film.

The average amount of remaining hydroxyl groups of the polyvinyl acetal used in the present invention is preferably 15 to 33 mol %, more preferably 23 to 32.5 mol %, still more preferably 27 to 32.0 mol %. When a mixture of polyvinyl acetal (A) and polyvinyl acetal (B) is used, the average amount of remaining hydroxyl groups of the polyvinyl acetal after mixing is preferably in the above-described range. When the polyvinyl acetal having the average amount of remaining hydroxyl groups in the range is used, a composition having excellent transparency is obtained, and a sheet using the composition and having excellent transparency is obtained.

The polyvinyl acetal used in the present invention, polyvinyl acetal (A), and polyvinyl acetal (B) are usually manufactured using polyvinyl alcohol as a raw material. The polyvinyl alcohol can be obtained by a conventionally known method, that is, by polymerizing a vinyl ester compound and saponifying the resulting polymer. As a method for polymerizing a vinyl ester compound, it is possible to use a conventionally known method such as a solution polymerization method, a bulk polymerization method, a suspension polymerization method, or an emulsion polymerization method. As a polymerization initiator, an azo initiator, a peroxide initiator, a redox initiator, or the like can be appropriately selected in accordance with the polymerization method. An alcoholysis or hydrolysis using a conventionally known alkali catalyst or acid catalyst is applicable to the saponification reaction. Among these, a saponification reaction using methanol as a solvent and using caustic soda (NaOH) as a catalyst is easy and most preferable.

Examples of the vinyl ester compound include a conventionally known vinyl carboxylate such as vinyl formate, vinyl acetate, vinyl propionate, vinyl butyrate, vinyl stearate, or vinyl benzoate. Particularly, vinyl acetate is preferable.

Unless contrary to the gist of the present invention, as the polyvinyl alcohol, modified polyvinyl alcohol obtained by copolymerizing the vinyl ester compound and another conventionally known monomer can be used. The conventionally known monomer is usually used in an amount of less than 10 mol % with respect to the vinyl ester monomer.

A viscosity average polymerization degree of the polyvinyl alcohol as a raw material of the polyvinyl acetal used in the present invention is not particularly limited, is appropriately selected in accordance with the application, but is preferably 150 to 3,000, more preferably 200 to 2,500, still more preferably 1,000 to 2,000. When the viscosity average polymerization degree of the polyvinyl alcohol is less than 150, strength tends to be insufficient when the resulting composition is made into a molded article. When the viscosity average polymerization degree of the polyvinyl alcohol is larger than 3,000, a handling property of the resulting composition tends to deteriorate.

The polyvinyl acetal used in the present invention can be synthesized, for example, under the following reaction conditions. However, the conditions are not limited thereto. First, the temperature of a polyvinyl alcohol aqueous solution having a concentration of 3 to 40% by mass is maintained in a range of 80 to 100° C. Thereafter, the temperature is gradually lowered over 10 to 60 minutes. When the temperature is lowered to −10 to 30° C., an aldehyde and an acid catalyst are added. While the temperature is maintained constant, an acetalization reaction is performed for 30 to 300 minutes (this temperature is referred to as a reaction temperature at the time of precipitation). At that time, a polyvinyl acetal the acetalization degree of which has reached a certain level is precipitated. Thereafter, the temperature of the reaction solution is raised to 30 to 80° C. over 30 to 300 minutes, and the temperature is maintained for 10 to 500 minutes (this temperature is referred to as a reaction temperature in the last stage). Subsequently, a neutralizing agent such as an alkali is added if necessary to the reaction solution to neutralize the acid catalyst. The resin is washed with water and dried to obtain the polyvinyl acetal used in the present invention.

In such a reaction, when the reaction temperature at the time of precipitation is a high temperature such as 20° C. or higher, or when the reaction temperature in the last stage is a high temperature such as 70° C. or higher, the reaction rate of the acetalization reaction is increased, and therefore, reaction time per batch can be shorter. On the other hand, the resulting polyvinyl acetal resin particles become larger, and variation in the batch tends to increase. In the present invention, as long as the requirements of the invention are satisfied, even when a polyvinyl acetal having a relatively wide distribution of the acetalization degree even in the same batch is used, a composition having excellent transparency and a sheet using the composition and having excellent transparency are obtained.

The acid catalyst used for the acetalization reaction is not particularly limited. Either an organic acid or an inorganic acid can be used. Examples thereof include acetic acid, p-toluenesulfonic acid, nitric acid, sulfuric acid, and hydrochloric acid. Among these, hydrochloric acid, sulfuric acid, or nitric acid is preferably used. When nitric acid is used, the reaction rate of the acetalization reaction is increased, and higher productivity can be expected. On the other hand, the particles of the resulting polyvinyl acetal easily become coarse, and tend to have a relatively wide distribution of the acetalization degree even in the same batch.

The aldehyde used in the acetalization reaction of the present invention is not particularly limited. However, from viewpoints of easy acetalization and easy removal of aldehyde remaining after the reaction, the acetalization is performed preferably with an aldehyde having 1 to 8 carbon atoms, more preferably with an aldehyde having 4 to 6 carbon atoms, particularly preferably with n-butyl aldehyde. In the present invention, it is also possible to use a polyvinyl acetal obtained by using two or more aldehydes together.

The average acetalization degree of the polyvinyl acetal used in the present invention is not particularly limited. However, the average acetalization degree is preferably 66 to 78 mol %, more preferably 66.5 to 75 mol %, still more preferably 67 to 72 mol % from a viewpoint of excellent balance between transparency and mechanical strength. An average amount of remaining vinyl carboxylate groups is preferably 0.1 to 20 mol %, more preferably 0.3 to 13 mol %, and still more preferably 0.5 to 10 mol % from viewpoints of excellent balance between transparency and mechanical strength and excellent durability when the composition of the present invention is used for a long time.

Next, the plasticizer used in the present invention will be described. By mixing, with respect to 100 parts by mass of the polyvinyl acetal satisfying definition 1 and/or definition 2, the plasticizer used in the present invention in an amount of 30 to 70 parts by mass, preferably 33 to 68 parts by mass, more preferably 50 to 66 parts by mass, a transparent and plasticized composition is obtained. Specifically, the plasticizer includes a plasticizer containing a polar group in an amount of 0.5 to 100% by mass, preferably 2 to 100% by mass, more preferably 5 to 100% by mass, and a plasticizer containing no polar group in an amount of 0 to 99.5% by mass, preferably 0 to 98% by mass, more preferably 0 to 95% by mass. The total of the plasticizer containing a polar group and the plasticizer containing no polar group is 100% by mass. When the content of the plasticizer containing a polar group in the plasticizer is less than 0.5% by mass, transparency of the sheet obtained from the composition is not sufficient. The phrase "The plasticizer used in the present invention includes a plasticizer containing a polar group in an amount of 100% by mass and a plasticizer containing no polar group in an amount of 0% by mass." means that the plasticizer used in the present invention includes only the plasticizer containing a polar group. In the composition of the present invention, when the composition of the present invention is treated under high humidity, for example, at 23° C. at 90% RH, the plasticizer containing a polar group prevents the composition of the present invention from being clouded or prevents the plasticizer containing no polar group from bleeding.

A compound to be used as a plasticizer containing a polar group is not particularly limited. The compound is not particularly limited as long as the compound has compatibility with the polyvinyl acetal used in the present invention, has a plasticizing effect on the polyvinyl acetal, and makes the polyvinyl acetals satisfying definition 1 and/or definition 2 compatible with each other. Each of the compounds may be used alone, or may be used in combination of two or more kinds thereof. Examples of the polar group include a hydroxyl group, a polyethyleneoxide group having a polymerization degree of 10 or more, a polypropylene oxide group having a polymerization degree of 10 or more, a carboxyl group, and an amino group. The plasticizer containing a polar group is particularly preferably a compound containing a hydroxyl group. When the plasticizer containing a polar group contains a hydroxyl group, a molecular weight thereof is not particularly limited. However, a compound having a molecular weight preferably of 200 to 2000, more preferably of 220 to 1000, still more preferably of 250 to 700, is used from a viewpoint of obtaining a sheet having excellent transparency in the present invention. A number average molecular weight based on a hydroxyl value of the compound containing a hydroxyl group is not particularly limited, but is preferably 200 to 2000, more preferably 220 to 1700, still more preferably 240 to 1500. When the number average molecular weight based on a hydroxyl value is less than 200, the boiling point of the compound may not be sufficiently high, and high volatility may be become a problem. When the number average molecular weight based on a hydroxyl value is more than 2000, the compatibility between the compound and the polyvinyl acetal may be insufficient. The number average molecular weight based on a hydroxyl value is obtained by (the number of hydroxyl groups per molecule of the compound containing a hydroxyl group)/(amount of substance [mol/g] of hydroxyl groups per g of the compound containing a hydroxyl group)=1000×(the number of hydroxyl groups per molecule of the compound containing a hydroxyl group)/((hydroxyl value of the compound containing a hydroxyl group)/56). Here, the number of hydroxyl groups per molecule of the compound containing a hydroxyl group when two or more kinds of the compounds containing a hydroxyl group are mixed and used refers to an average value per molecule of the compound containing a hydroxyl group included in the mixture.

The compound containing a hydroxyl group is not particularly limited as long as the compound contains one or more, preferably 1 to 4, more preferably 1 to 3 hydroxyl groups. Each of the compounds may be used alone, or may be used in combination of two or more kinds thereof. However, in order to obtain compatibility with the polyvinyl acetal and a plasticizing effect thereon, and further to sufficiently obtain a transparent sheet by making the polyvinyl acetal used in the present invention compatible, the compound is preferably an ester compound containing a hydroxyl group and/or an ether compound containing a hydroxyl group. The ester compound containing a hydroxyl group contains at least one ester bond and a hydroxyl group. The ether compound containing a hydroxyl group contains at least one ether bond and a hydroxyl group.

Specific examples of the ester compound containing a hydroxyl group include methyl ricinoleate, butyl ricinoleate, 2-ethylhexyl ricinoleate, (2-hydroxyethyl)ricinoleate, glycerin monoricinoleate, glycerin diricinoleate, glycerin triricinoleate, glycerin diricinoleate monooleate, (2-hydroxyethyl) oleate, (2-hydroxyethyl) 2-ethylhexanoate, {2-[2-(2-hydroxyethoxy) ethoxy]ethyl}ricinoleate, {2-[2-(2-hydroxyethoxy)ethoxy]ethyl}2-ethylhexanoate, methyl ricinoleate, ethyl ricinoleate, butyl ricinoleate, octyl ricinoleate, octyl 6-hydroxy hexanoate, methyl 12-hydroxy stearate, castor oil, and a polyester compound containing a hydroxyl group. Among these, a polyester compound containing a hydroxyl group is preferably used from viewpoints of excellent compatibility with the polyvinyl acetal used in the present invention, an excellent plasticizing effect on the polyvinyl acetal, and a capability of obtaining a transparent sheet by making the polyvinyl acetal compatible. The castor oil is glycerin tricarboxylate derived from castor seeds. A ricinoleate occupies a majority of the carboxylic acid ester moieties, generally 80 to 95% by mass thereof. A palmitate, a stearate, an oleate, a linoleate, a linolenate, and the like occupy the remaining part.

The polyester compound containing a hydroxyl group (hereinafter, simply referred to as polyester (C)) is not particularly limited. However, examples thereof include a polyester (C-1) which is a condensation copolymer of a polyvalent carboxylic acid and a polyhydric alcohol and contains a hydroxyl group (hereinafter, simply referred to as polyester (C-1)), a polyester (C-2) which is a polymer of a hydroxycarboxylic acid and contains a hydroxyl group (hereinafter, simply referred to as polyester (C-2)), and a polycarbonate polyol (C-3) containing a hydroxyl group (hereinafter, simply referred to as polyester (C-3)).

Polyester (C-1) is obtained by subjecting a polyvalent carboxylic acid and a polyhydric alcohol to condensation polymerization while the polyhydric alcohol exists in an excessive amount.

Examples of the polyvalent carboxylic acid include an aliphatic divalent carboxylic acid such as succinic acid, glutaric acid, adipic acid, suberic acid, sebacic acid, dodecanedioic acid, or 1,2-cyclohexanedicarboxylic acid, an aliphatic trivalent carboxylic acid such as 1,2,3-propane tricarboxylic acid or 1,3,5-pentatricarboxylic acid, an aromatic dicarboxylic acid such as phthalic acid or terephthalic acid, and an aromatic trivalent carboxylic acid such as trimellitic acid. However, the polyvalent carboxylic acid is not limited thereto. Among these, an aliphatic divalent carboxylic acid, particularly an aliphatic divalent carboxylic acid having 6 to 10 carbon atoms is preferable from viewpoints of an excellent plasticizing effect of the resulting polyester on the polyvinyl acetal and a capability of obtaining a transparent sheet by making the polyvinyl acetal compatible. Examples of the polyhydric alcohol include an aliphatic dihydric alcohol such as 1,2-propanediol, 1,3-propanediol, 1,2-butanediol, 1,3-butanediol, 1,4-butanediol, 1,2-hexanediol, 3-methyl-1,5-pentanediol, 1,2-octanediol, 1,2-nonanediol, 1,8-nonanediol, 1,9-nonanediol, 1,2-cyclohexanediol, 1,2-cyclohexanedimethanol, 1,4-cyclohexanedimethanol, diethylene glycol, or triethylene glycol; an aliphatic trihydric alcohol such as glycerin; and an aliphatic tetrahydric alcohol such as erythritol or pentaerythritol. However, the polyhydric alcohol is not limited thereto. Among these, the aliphatic dihydric alcohol is preferable because the aliphatic dihydric alcohol has excellent weather resistance of polyester (C-1), excellent compatibility with the polyvinyl acetal, and an excellent plasticizing effect on the polyvinyl acetal.

Polyester (C-2) is obtained by subjecting a hydroxycarboxylic acid to condensation polymerization. Examples of the hydroxycarboxylic acid include glycolic acid, lactic acid, 2-hydroxybutanoic acid, 3-hydroxybutanoic acid, 4-hydroxybutanoic acid, 6-hydroxy hexanoic acid, and ricinoleic acid. A lactone compound obtained by subjecting a hydroxycarboxylic acid to intramolecular condensation can be also used as a raw material. Examples of the lactone compound include β-butyrolactone, δ-valerolactone, ε-caprolactone, and 4-methyl-δ-valerolactone. However, the lactone compound is not limited thereto. When the lactone compound is used, it is possible to obtain polyester (C-2) by ring-opening polymerization. Among these, 6-hydroxy carboxylic acid or ε-caprolactone is preferable from viewpoints of heat resistance of polyester (C-2), compatibility with the polyvinyl acetal, and a plasticizing effect thereon.

Examples of the ether compound containing a hydroxyl group include ethylene glycol monohexyl ether and a polyether compound containing a hydroxyl group. Among these, the polyether compound containing a hydroxyl group is preferable from viewpoints of compatibility with the polyvinyl acetal used in the present invention, a plasticizing effect on the polyvinyl acetal, and making the polyvinyl acetal compatible. The polyether compound containing a hydroxyl group is a polymer of a polyhydric alcohol such as ethylene glycol or 1,2-propylene glycol, and includes a hydroxyl group. Preferable examples thereof include polyethylene glycol and polypropylene glycol.

Solubility in water of the plasticizer containing a polar group used in the present invention is not particularly limited. However, a dissolved amount thereof in 100 g of water at 20° C. is preferably 100 g or less, more preferably 50 g or less, still more preferably 10 g or less, further still more preferably 2 g or less, because when a molded article obtained from the composition of the present invention comes in contact with water, the plasticizer containing a polar group is hardly eluted due to the water. When the plasticizer containing a polar group used in the present invention is a compound containing a hydroxyl group, the hydroxyl value thereof is not particularly limited. However, the hydroxyl value is preferably 50 to 600 mgKOH/g, more preferably 70 to 500 mgKOH/g, still more preferably 100 to 400 mgKOH/g. When the hydroxyl value is less than 50 mgKOH/g, a sheet obtained from the polyvinyl acetal composition of the present invention may have poor transparency. Meanwhile, when the hydroxyl value is more than 600 mgKOH/g, compatibility with the polyvinyl acetal may be lowered, transparency may be poor, or a molded article may bleed. Here, the hydroxyl value in the present invention is a value obtained by measurement by a method described in JIS K1557-1 (2007). When two or more kinds of the compounds containing a hydroxyl group are mixed and used, the hydroxyl value indicates a hydroxyl value of the mixture (mixture of compounds containing a hydroxyl group in the same mixing ratio as in the polyvinyl acetal composition of the present invention).

Examples of the plasticizer containing no polar group included in the plasticizer of the present invention include a plasticizer not containing such a polar group as a hydroxyl group, a polyethyleneoxide group having a polymerization degree of 10 or more, a polypropyleneoxide group having a polymerization degree of 10 or more, a carboxyl group, or an amino group. More specific examples thereof include a diester compound of a polyhydric alcohol and a monovalent carboxylic acid, containing no polar group, and a diester compound of a polyvalent carboxylic acid and a monohydric alcohol, containing no polar group. Examples of the diester compound of a polyhydric alcohol and a monovalent carboxylic acid, containing no polar group, include triethylene glycol di-2-ethylhexanoate and tetraethylene glycol di-2-ethylhexanoate. Examples of the diester compound of a polyvalent carboxylic acid and a monohydric alcohol, containing no polar group, include dihexyl adipate, dioctyl adipate, di(butoxyethyl)adipate, di(butoxyethoxyethyl)adipate, dibutyl sebacate, dioctyl sebacate, dioctyl phthalate, di(2-ethylhexyl)phthalate, di(octyl)cyclohexane dicarboxylate, and di(isononyl)cyclohexane dicarboxylate. Among these, a diester compound of a monovalent carboxylic acid and triethylene glycol or tetraethylene glycol such as triethylene glycol di-2-ethylhexanoate or tetraethylene glycol di-2-ethylhexanoate, containing no polar group, is preferable from viewpoints of compatibility with the polyvinyl acetal, a plasticizing effect on the polyvinyl acetal, low volatility, and the like.

The plasticizer used in the present invention is not particularly limited as long as the plasticizer includes 0.5 to 100% by mass of a plasticizer containing a polar group and 0 to 99.5% by mass of a plasticizer containing no polar group, and the total content of the plasticizer containing a polar group and the plasticizer containing no polar group is 100% by mass. Particularly, the plasticizer includes, as the plasticizer containing a polar group, a compound containing a hydroxyl group preferably in an amount of 0.5 to 5.0% by mass, more preferably in an amount of 0.5 to 4.0% by mass, still more preferably in an amount of 0.5 to 2.0% by mass, particularly preferably in an amount of 1.0 to 2.0% by mass, of the total content of the plasticizer, from a viewpoint of obtaining a composition having excellent balance between moisture resistance, mechanical strength, and the like. Furthermore, the plasticizer includes, as the plasticizer containing no polar group, a diester compound of a monovalent carboxylic acid and triethylene glycol or tetraethylene glycol, containing no polar group, preferably in an amount of 70 to 99.5% by mass, more preferably in an amount of 90 to 99.5% by mass, still more preferably in an amount of 95 to 99.5% by mass. The total content of the plasticizer containing a polar group and the plasticizer containing no polar group is preferably 100% by mass. When a plasticizer including a diester compound of a monovalent carboxylic acid and triethylene glycol or tetraethylene glycol, containing no polar group in an amount of 70 to 99.5% by mass, the plasticizer containing a polar group is preferably a compound including a structure obtained by hydrolyzing either one of the two ester bonds included in the diester, that is, a compound containing one hydroxyl group and one ester bond, from a viewpoint of improving compatibility with the plasticizer containing a polar group.

The composition of the present invention may further include an antioxidant, an ultraviolet absorber, a plasticizer, an adhesion improver, and other additives unless contrary to the gist of the present invention.

When an antioxidant is added to the composition of the present invention, the kind thereof is not particularly limited. Examples thereof include a conventionally known phenolic antioxidant, phosphorus antioxidant, and sulfur antioxidant. Among these, the phenolic antioxidant is preferable, and an alkyl-substituted phenolic antioxidant is particularly preferable. Each of these antioxidants can be used alone or can be used in combination of two or more kinds thereof. An addition amount of the antioxidant is not particularly limited, but is 0.0001 to 5% by mass, preferably 0.001 to 1% by mass with respect to the mass of the composition. When the addition amount of the antioxidant is less than 0.0001% by mass, a sufficient effect may not be obtained. Even when the addition amount of the antioxidant is larger than 5% by mass, a remarkable effect cannot be expected.

When a ultraviolet absorber is added to the composition of the present invention, the kind thereof is not particularly limited. Examples thereof include a conventionally known benzotriazole ultraviolet absorber, anilide oxalate ultraviolet absorber, and benzoate ultraviolet absorber. Each of these ultraviolet absorbers can be used alone or can be used in combination of two or more kinds thereof. An addition amount of the ultraviolet absorber is not particularly limited, but is 0.0001 to 5% by mass, preferably 0.001 to 1% by mass with respect to the mass of the composition. When the addition amount of the ultraviolet absorber is less than 0.0001% by mass, a sufficient effect may not be obtained. Even when the addition amount of the ultraviolet absorber is larger than 5% by mass, a remarkable effect cannot be expected.

When a sheet obtained from the composition of the present invention is used for an application where it is necessary to appropriately adjust adhesion to glass, such as an interlayer film for laminated glass, an adhesion control agent may be added to the composition of the present invention. A conventionally known adhesion control agent can be used. Examples thereof include a sodium salt, a potassium salt, and a magnesium salt of an organic acid such as acetic acid, propionic acid, butanoic acid, hexanoic acid, 2-ethyl butanoic acid, or 2-ethylhexanoic acid. Each of these salts may be used alone or may be used in combination of two or more kinds thereof. An addition amount of the adhesion control agent is preferably 0.0001 to 1% by mass, more preferably 0.0005 to 0.1% by mass, still more preferably 0.001 to 0.03% by mass with respect to the mass of the composition.

The composition of the present invention can be obtained by mixing the specific polyvinyl acetal defined in the present invention, a specific plasticizer, and other components by a conventionally known method. Examples thereof include a method in which components included in the composition of the present invention are dissolved in an organic solvent which can dissolve the components, and the organic solvent is then distilled out; and a method in which components included in the composition of the present invention are melt kneaded using an extruder or the like.

The glass transition temperature of the composition of the present invention is not particularly limited, and can be selected appropriately according a purpose. However, the glass transition temperature is preferably within a range of 0 to 50° C., more preferably of 0 to 45° C., still more preferably of 0 to 40° C. The glass transition temperature of the composition of the present invention within the above-described range is suitable particularly when the composition of the present invention is molded into a sheet to be used as an interlayer film for laminated glass.

The composition of the present invention has excellent transparency and flexibility. Therefore, the composition of the present invention is suitable as an interlayer film for laminated glass particularly when being molded into a sheet. In this case, the thickness of the sheet is not particularly limited, but is preferably 0.05 to 5.0 mm. The thickness is more preferably 0.1 to 2.0 mm, still more preferably 0.1 to 1.2 mm from a viewpoint of use as the interlayer film for laminated glass.

When the sheet of the present invention is used as an interlayer film for laminated glass, glass to be used is not particularly limited. Examples thereof include inorganic glass polymethyl methacrylate such as float plate glass, polished plate glass, template glass, wire-reinforced plate glass, or heat-absorbing plate glass, and conventionally known organic glass such as polycarbonate. These glasses may be colorless or colored, and furthermore, may be transparent or non-transparent. Each of these glasses may be used alone or may be used in combination of two or more kinds thereof. The thickness of the glass is not particularly limited, but, in general, is preferably 100 mm or less.

When the sheet of the present invention is used as an interlayer film for laminated glass, a shape of the outermost surface of the sheet is not particularly limited. However, an uneven structure is preferably formed on the outermost surface of a laminated product by a conventionally known method such as melt fracture or embossing from a viewpoint of a handling property (foam removing property) at the time of laminating the sheet with the glass.

The laminated glass of the present invention can be manufactured by a conventionally known method. Examples thereof include a method using a device such as a vacuum laminator, a vacuum bag, a vacuum ring, or a nip roll. In addition, a method of introducing a temporarily pressure-bonded product obtained by temporary pressure-bonding by the above-described method into an autoclave can be additionally carried out.

When a vacuum laminator is used, laminated glass can be manufactured, for example, under reduced pressure of $1 \times 10^{-6}$ to $3 \times 10^{-2}$ MPa, at 100 to 200° C., particularly at 130 to 160° C. A method of using a vacuum bag or a vacuum ring is described, for example, in European Patent No. 1235683. Laminated glass can be manufactured, for example, at about a pressure of $2\times10^{-2}$ MPa, at 130 to 145° C.

When a nip roll is used, for example, first pressure-bonding is performed at a flow starting temperature of the composition of the present invention or lower, and then pressure-bonding is performed in conditions close to the flow starting temperature. Specifically, for example, a sheet made from the composition of the present invention is heated to 30 to 70° C. with an infrared heater or the like. Thereafter, the sheet is degassed with a roll. Subsequently, the sheet is heated to 50 to 120° C., and is then pressure-bonded by a roll to be bonded or temporarily bonded to glass.

An autoclaving step which may be performed additionally after temporary pressure-bonding depends on the thickness and the structure of laminated glass, but is performed, for example, under a pressure of 1.0 to 1.5 MPa, at 130 to 145° C. for 0.5 to 3 hours.

Hereinafter, the present invention will be described in more detail using Examples. However, the present invention is not limited in any way by the Examples.

Manufacturing Example 1

A 10 L (liter) glass container equipped with a reflux condenser, a thermometer, and an anchor type stirring blade was charged with 8100 g of ion-exchanged water and 660 g of polyvinyl alcohol (PVA-1: viscosity average polymerization degree: 1700, saponification degree: 99 mol %) (PVA concentration: 7.5%). The temperature of the contents was raised to 95° C., and the contents were completely dissolved. Subsequently, while the contents were stirred at 120 rpm, the temperature thereof was gradually lowered to 5° C. over about 30 minutes. Thereafter, 384 g of butylaldehyde and 540 mL of 20% hydrochloric acid were added thereto, and a butyralization reaction was performed for 150 minutes. Thereafter, the temperature was raised to 50° C. over 60 minutes, was maintained at 50° C. for 120 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-1). When the resulting PVB-1 was measured in accordance with JIS K6728, an average butyralization degree was 69 mol %, the content of remaining vinyl acetate groups was 1 mol %, and an average amount of remaining hydroxyl groups was 30 mol % (refer to Table 1).

Manufacturing Example 2

A 10 L (liter) glass container equipped with a reflux condenser, a thermometer, and an anchor type stirring blade was charged with 8100 g of ion-exchanged water and 723 g of polyvinyl alcohol (PVA-2: viscosity average polymerization degree: 1700, saponification degree: 92 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 456 g of butylaldehyde and 540 mL of 20% hydrochloric acid were added thereto, and a butyralization reaction was performed for 150 minutes. Thereafter, the temperature was raised to 65° C. over 60 minutes, was maintained at 65° C. for 120 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-2). When the resulting PVB-2 was measured in accordance with JIS K6728, an average butyralization degree (average acetalization degree) was 74 mol %, the content of remaining vinyl acetate groups was 6 mol %, and an average amount of remaining hydroxyl groups was 20 mol % (refer to Table 1).

Manufacturing Example 3

A 10 L (liter) glass container equipped with a reflux condenser, a thermometer, and an anchor type stirring blade was charged with 8100 g of ion-exchanged water and 723 g of polyvinyl alcohol (PVA-3: viscosity average polymerization degree: 1700, saponification degree: 90 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 432 g of butylaldehyde and 540 mL of 20% hydrochloric acid were added thereto, and a butyralization reaction was performed for 150 minutes. Thereafter, the temperature was raised to 58° C. over 60 minutes, was maintained at 58° C. for 120 minutes, and was lowered to room temperature. After a precipitated resin was washed with ion-exchanged water, an excessive amount of sodium hydroxide aqueous solution was added thereto. The resin was further washed and dried to obtain polyvinyl butyral (PVB-3). When the resulting PVB-3 was measured in accordance with JIS K6728, an average butyralization degree was 69 mol %, the content of remaining vinyl acetate groups was 9 mol %, and an average amount of remaining hydroxyl groups was 22 mol % (refer to Table 1).

Manufacturing Example 4

A 10 L (liter) glass container equipped with a reflux condenser, a thermometer, and an anchor type stirring blade was charged with 8100 g of ion-exchanged water and 723 g of polyvinyl alcohol (PVA-4: viscosity average polymerization degree: 1700, saponification degree: 87 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 427 g of butylaldehyde and 540 mL of 20% hydrochloric acid were added thereto, and a butyralization reaction was performed for 150 minutes. Thereafter, the temperature was raised to 66° C. over 60 minutes, was maintained at 66° C. for 110 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-4). When the resulting PVB-4 was measured in accordance with JIS K6728, an average butyralization degree was 68 mol %, the content of remaining vinyl acetate groups was 12 mol %, and an average amount of remaining hydroxyl groups was 20 mol % (refer to Table 1).

Manufacturing Example 5

A 10 L (liter) glass container equipped with a reflux condenser, a thermometer, and an anchor type stirring blade was charged with 8100 g of ion-exchanged water and 660 g of polyvinyl alcohol (PVA-1: viscosity average polymerization degree: 1700, saponification degree: 99 mol %) (PVA concentration: 7.5%). The temperature of the contents was raised to 95° C., and the contents were completely dissolved. Subsequently, while the contents were stirred at 120 rpm, the temperature thereof was gradually lowered to 22° C. over about 30 minutes. Thereafter, 385 g of butylaldehyde and 300 mL of 30% hydrochloric acid were added thereto, and a butyralization reaction was performed for 120 minutes. Thereafter, the temperature was raised to 80° C. over 60 minutes, was maintained at 80° C. for 100 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-5). When the resulting PVB-5 was measured in accordance with JIS K6728, an average butyralization degree was 68 mol %, the content of remaining vinyl acetate groups was 1 mol %, and an average amount of remaining hydroxyl groups was 31 mol % (refer to Table 1).

Manufacturing Example 6

A 10 L (liter) glass container equipped with a reflux condenser, a thermometer, and an anchor type stirring blade was charged with 8100 g of ion-exchanged water and 660 g of PVA-5 (viscosity average polymerization degree: 1700, saponification degree: 92 mol %) (PVA concentration: 7.5%). The temperature of the contents was raised to 95° C., and the contents were completely dissolved. Subsequently, while the contents were stirred at 120 rpm, the temperature thereof was gradually lowered to 23° C. over about 30 minutes. Thereafter, 410 g of butylaldehyde and 300 mL of 30% hydrochloric acid were added thereto, and a butyralization reaction was performed for 120 minutes. Thereafter, the temperature was raised to 77° C. over 60 minutes, was maintained at 77° C. for 100 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-6). When the resulting PVB-6 was measured in accordance with JIS K6728, an average butyralization degree was 73 mol %, the content of remaining vinyl acetate groups was 7 mol %, and an average amount of remaining hydroxyl groups was 20 mol % (refer to Table 1).

Manufacturing Example 7

PVB-7 was obtained in a similar manner to the preparation of the PVB-1 except that the use amount of butylaldehyde was changed to 350 g. When the resulting PVB-7 was measured in accordance with JIS K6728, an average butyralization degree was 63 mol %, the content of remaining vinyl acetate groups was 1 mol %, and an average amount of remaining hydroxyl groups was 36 mol % (refer to Table 1).

Manufacturing Example 8

PVB-8 was obtained in a similar manner to the preparation of the PVB-3 except that the use amount of butylaldehyde was changed to 468 g. When the resulting PVB-8 was measured in accordance with JIS K6728, an average butyralization degree was 74 mol %, the content of remaining vinyl acetate groups was 9 mol %, and an average amount of remaining hydroxyl groups was 17 mol % (refer to Table 1).

Manufacturing Example 9

PVB-9 was obtained in a similar manner to the preparation of the PVB-1 except that the use amount of butylaldehyde was changed to 524 g. An average butyralization degree of PVB-9 was 82 mol %, the content of remaining vinyl acetate groups was 1 mol %, and an average amount of remaining hydroxyl groups was 17 mol % (refer to Table 1).

TABLE 1

| | average butyralization degree (mol %) | content of remaining vinyl acetate groups (mol %) | average amount of remaining hydroxyl groups (mol %) | reaction temperature at the time of precipitation (° C.) |
|---|---|---|---|---|
| PVB-1 | 69 | 1 | 30 | 5 |
| PVB-2 | 74 | 6 | 20 | 5 |
| PVB-3 | 69 | 9 | 22 | 5 |
| PVB-4 | 68 | 12 | 20 | 5 |
| PVB-5 | 68 | 1 | 31 | 22 |
| PVB-6 | 73 | 7 | 20 | 23 |
| PVB-7 | 63 | 1 | 36 | 5 |
| PVB-8 | 74 | 9 | 17 | 5 |
| PVB-9 | 82 | 1 | 17 | 5 |

Example 1

Using a labo plastomill, 100 parts by mass of polyvinyl acetal-1 (mixture in a mass ratio of PVB-1:PVB-2=80:20) and 50 of parts by mass of castor oil (glycerin tricarboxylate, 86% by mass of the carboxylic acid ester moieties: ricinoleate, 13% by mass thereof: any one of a palmitate, stearate, oleate, linoleate, and linolenate, 1% by mass thereof: other carboxylic acid esters; the number of hydroxyl groups per molecule: 2.6, hydroxyl value: 160 mgKOH/g, number average molecular weight based on hydroxyl value: 910) were melt kneaded (150° C., 5 minutes) to obtain composition-1. Composition-1 was hot pressed (150° C., 30 minutes) to obtain sheet-1 of 10 cm×10 cm×0.8 mm. The water content of sheet-1 was adjusted to 0.5% (maintained at 20° C. at RH 30% for 24 hours). Thereafter, sheet-1 was temporarily pressure-bonded in a vacuum bag while being sandwiched between two glass plates of 10 cm×10 cm×3.2 mm. Thereafter, sheet-1 was treated in an autoclave at 140° C. at 1.2 MPa for 40 minutes to obtain laminated glass-1.

(Analysis of Polyvinyl Acetal-1)

(1) Analysis of Undissolved Fragment when Polyvinyl Acetal-1 is Dissolved in Methanol To 100 g of methanol, 1 g of polyvinyl acetal-1 having a major axis of each particle or each lump of 3 mm or less was added such that the polyvinyl acetal-1 did not become) agglomerated while the methanol was stirred. After a treatment at 25° C. for 72 hours, a resulting solution (including an undissolved fragment) was subjected to filtration under reduced pressure at a differential pressure of 0.010±0.002 MPa using filter paper classified into five A defined in JIS P3801. A dry weight of the components remaining on the filter paper was measured. When 1 g of polyvinyl acetal-1 was dissolved in methanol, an undissolved content was 19% by mass.

(2) Analysis of Undissolved Fragment when Polyvinyl Acetal-1 is Dissolved in Chloroform To 100 g of chloroform, 1 g of polyvinyl acetal-1 having a major axis of each particle or each lump of 3 mm or less was added such that polyvinyl acetal-1 did not become agglomerated while the chloroform was stirred. After a treatment at 25° C. for 72 hours, a resulting solution (including an undissolved fragment) was subjected to filtration under reduced pressure at a differential pressure of 0.010±0.002 MPa using filter paper classified into five A defined in JIS P3801. A dry weight of the components remaining on the filter paper was measured. When 1 g of polyvinyl acetal-1 was dissolved in 100 g of chloroform, an undissolved content was 0% by mass.

(3) Titration of Ethanol Solution with Hexane

A clear solution was obtained by dissolving 1 g of polyvinyl acetal-1 in 100 g of ethanol. The solution was titrated with hexane while the solution was stirred at 23° C. When the dropping amount reached 180 mL, the solution became clouded.

(4) Titration of Ethanol Solution with Deionized Water

A clear solution was obtained by dissolving 1 g of polyvinyl acetal-1 in 100 g of ethanol. The solution was titrated with deionized water while the solution was stirred at 23° C. When the dropping amount of deionized water reached 28 mL, the solution became clouded.

Evaluation results of polyvinyl acetal-1 are shown in Table 2.

(Evaluation of Sheet Made from Composition: Tan δ)

Sheet-1 was cut with a width of 3 mm, and dynamic viscoelasticity was measured using RSA-G2 manufactured by TA Instruments Japan Inc. (pulling mode, frequency: 0.3 Hz, The measurement was started from −20° C., and the temperature was raised at 3° C./min. The measurement was terminated when the temperature reached 100° C.). Temperature at which tan δ was maximized within the measurement range (peak temperature of tan δ, i.e., glass transition temperature in the present invention) was 27° C. Results are shown in Table 4.

(Evaluation of Sheet Made from Composition: Cloudiness During Water Absorption, Bleeding)

After sheet-1 was allowed to stand at 23° C. at 90% RH for two weeks, existence of cloudiness and existence of bleeding were checked. Neither thereof was observed. Results are shown in Table 4.

(Evaluation of Laminated Glass: Haze)

Haze of laminated glass-1 was measured using a haze meter (HZ-1) manufactured by Suga Test Instruments Co., Ltd. The haze was 0.6%. Results are shown in Table 4.

(Evaluation of Laminated Glass: Cloudiness at the Time of Irradiation with Light)

Laminated glass-1 was irradiated with light of 2700 lumens from a direction perpendicular to a surface of laminated glass-1 from a position 20 cm away therefrom. Existence of cloudiness in a part irradiated with light was checked from an obliquely upper side of the laminated glass by visual observation. Cloudiness was not observed. Results are shown in Table 4.

Examples 2 to 25

Comparative Examples 1 to 3

PVB-1 to PVB-9 were mixed in the compositions shown in Table 2 in a similar manner to Example 1 to obtain polyvinyl acetals-2 to 25 and comparative polyvinyl acetals-1 to 3. An undissolved content was measured when a polyvinyl acetal was dissolved in methanol or chloroform. A polyvinyl acetal dissolved in ethanol was titrated with hexane or deionized water. Furthermore, a polyvinyl acetal, a plasticizer containing a polar group, and a plasticizer containing no polar group were mixed in the compositions shown in Table 2 or 3 in a similar manner to Example 1 to obtain compositions-2 to 25 and comparative compositions 1 to 3. Furthermore, sheets-2 to 25, comparative sheets 1 to 3, laminated glass-2 to 25, and comparative laminated glass 1 to 3 were obtained from these compositions in a similar manner to Example 1. The resulting sheets and laminated glass were evaluated in a similar manner to Example 1. Results are shown in Tables 2 to 4.

TABLE 2

| | polyvinyl acetal | | | | | plasticizer | |
|---|---|---|---|---|---|---|---|
| | mixing ratio (parts by mass) | | undissolved content (%) | | titration amount of ethanol solution (mL) | | plasticizer containing a polar group | plasticizer containing no polar group |
| | component 1 | component 2 | definition 1 | definition 2 | hexane | deionized water | (parts by mass) | (parts by mass) |
| Example 1 | PVB-1 (80) | PVB-2 (20) | 19 | 0 | 180 | 28 | castor oil (50) | |
| Example 2 | PVB-1 (80) | PVB-2 (20) | 19 | 0 | 180 | 28 | castor oil (40) | |
| Example 3 | PVB-1 (80) | PVB-2 (20) | 19 | 0 | 180 | 28 | castor oil (65) | |
| Example 4 | PVB-1 (80) | PVB-2 (20) | 19 | 0 | 180 | 28 | castor oil (30) | 3GO*[3] (10) |
| Example 5 | PVB-1 (80) | PVB-2 (20) | 19 | 0 | 180 | 28 | polyester polyol*[1] (40) | |
| Example 6 | PVB-1 (80) | PVB-2 (20) | 19 | 0 | 180 | 28 | polyester polyol*[1] (62) | |
| Example 7 | PVB-1 (80) | PVB-2 (20) | 19 | 0 | 180 | 28 | polyester polyol*[1] (20) | 3GO*[3] (20) |
| Example 8 | PVB-1 (80) | PVB-2 (20) | 19 | 0 | 180 | 28 | polypropylene glycol*[2] (40) | |
| Example 9 | PVB-1 (80) | PVB-2 (20) | 19 | 0 | 180 | 28 | polypropylene glycol*[2] (58) | |
| Example 10 | PVB-1 (70) | PVB-2 (30) | 29 | 0 | 180 | 28 | castor oil (50) | |
| Example 11 | PVB-1 (50) | PVB-2 (50) | 48 | 0 | 180 | 28 | castor oil (50) | |
| Example 12 | PVB-1 (10) | PVB-2 (90) | 86 | 0 | 180 | 28 | castor oil (50) | |
| Example 13 | PVB-1 (90) | PVB-2 (10) | 9 | 0 | 180 | 28 | castor oil (50) | |
| Example 14 | PVB-1 (80) | PVB-3 (20) | 19 | 0 | 180 | 32 | castor oil (50) | |
| Example 15 | PVB-1 (80) | PVB-4 (20) | 19 | 0 | 180 | 31 | castor oil (50) | |
| Example 16 | PVB-5 (100) | | 4 | 0 | 172 | 36 | castor oil (3) | 3GO*[3] (37) |
| Example 17 | PVB-5 (100) | | 4 | 0 | 172 | 36 | castor oil (1) | 3GO*[3] (39) |

*[1]condensation polymer of adipic acid and 3-methyl-1,5-pentanediol The number of hydroxyl group per molecule = 2, average molecular weight based on hydroxyl value = 500, average hydroxyl value obtained in accordance with JIS K1557-1 (2007) = 224 mgKOH/g, melting point lower than −20° C.
*[2]compound obtained by addition polymerization of 1,2-propylenediol and propyleneoxide The number of hydroxyl group per molecule = 2, average molecular weight based on hydroxyl value = 500, average hydroxyl value obtained in accordance with JIS K1557-1 (2007) = 224 mgKOH/g, melting point lower than −20° C.
*[3]triethylene glycol di-2-ethylhexanoate

TABLE 3

| | polyvinyl acetal | | | | | | plasticizer | |
|---|---|---|---|---|---|---|---|---|
| | mixing ratio (parts by mass) | | undissolved content (%) | | titration amount of ethanol solution (mL) | | plasticizer containing a polar group | plasticizer containing no polar group |
| | component 1 | component 2 | definition 1 | definition 2 | hexane | deionized water | (parts by mass) | (parts by mass) |
| Example 18 | PVB-5 (100) | | 4 | 0 | 172 | 36 | ester compound containing a hydroxyl group*3 (0.4) | 3GO*3 (37) |
| Example 19 | PVB-6 (100) | | 84 | 0 | 201 | 32 | ester compound containing a hydroxyl group*3 (0.4) | 3GO*3 (37) |
| Example 20 | PVB-5 (100) | | 4 | 0 | 172 | 36 | ester compound containing a hydroxyl group*3 (0.8) | 3GO*3 (53) |
| Example 21 | PVB-6 (100) | | 84 | 0 | 201 | 32 | ester compound containing a hydroxyl group*3 (0.5) | 3GO*3 (62) |
| Example 22 | PVB-1 (80) | PVB-7 (20) | 0 | 15 | 146 | 40 | polyester polyol*1 (45) | |
| Example 23 | PVB-2 (60) | PVB-7 (40) | 56 | 30 | 146 | 28 | polypropylene glycol*2 (40) | |
| Example 24 | PVB-1 (80) | PVB-8 (20) | 19 | 0 | 185 | 29 | castor oil (50) | |
| Example 25 | PVB-1 (80) | PVB-9 (20) | 20 | 0 | 225 | 12 | castor oil (50) | |
| Comparative Example 1 | PVB-1 (80) | PVB-2 (20) | 19 | 0 | 180 | 28 | | 3GO*3 (40) |
| Comparative Example 2 | PVB-1 (80) | PVB-3 (20) | 19 | 0 | 180 | 32 | | 3GO*3 (40) |
| Comparative Example 3 | PVB-5 (100) | | 4 | 0 | 172 | 36 | | 3GO*3 (39) |

*4: {2-[2-(2-hydroxyethoxy)ethoxy]ethyl}2-ethylhexanoate

TABLE 4

| | evaluation of sheet | | | evaluation of laminated glass | |
|---|---|---|---|---|---|
| | tanδ peak temperature (° C.) | 23° C., 90% RH, after two weeks | | | |
| | | Cloudiness (%) | bleeding | haze (%) | cloudiness at the time of irradiation with light |
| Example 1 | 27 | not observed | not observed | 0.6 | not observed |
| Example 2 | 31 | not observed | not observed | 0.7 | not observed |
| Example 3 | 23 | not observed | not observed | 0.5 | not observed |
| Example 4 | 28 | not observed | not observed | 0.9 | not observed |
| Example 5 | 26 | not observed | not observed | 0.6 | not observed |
| Example 6 | 21 | not observed | not observed | 0.6 | not observed |
| Example 7 | 24 | not observed | not observed | 0.8 | not observed |
| Example 8 | 25 | not observed | not observed | 0.5 | not observed |
| Example 9 | 21 | not observed | not observed | 0.4 | not observed |
| Example 10 | 25 | not observed | not observed | 0.7 | not observed |
| Example 11 | 22 | not observed | not observed | 0.9 | not observed |
| Example 12 | 22 | not observed | not observed | 0.7 | not observed |
| Example 13 | 28 | not observed | not observed | 0.6 | not observed |
| Example 14 | 27 | not observed | not observed | 0.6 | not observed |
| Example 15 | 28 | not observed | not observed | 0.7 | not observed |
| Example 16 | 26 | not observed | not observed | 0.8 | not observed |
| Example 17 | 26 | not observed | not observed | 0.9 | not observed |
| Example 18 | 27 | slightly observed | not observed | 0.7 | not observed |
| Example 19 | 24 | slightly observed | not observed | 0.7 | not observed |
| Example 20 | 21 | slightly observed | not observed | 0.8 | not observed |
| Example 21 | 18 | slightly observed | not observed | 0.8 | not observed |
| Example 22 | 31 | not observed | not observed | 0.8 | slightly observed |
| Example 23 | 29 | not observed | not observed | 0.9 | slightly observed |
| Example 24 | 26 | not observed | not observed | 0.7 | not observed |
| Example 25 | 24 | not observed | not observed | 0.8 | slightly observed |
| Comparative Example 1 | 26 | observed | observed | 9.4 | observed |
| Comparative Example 2 | 27 | observed | observed | 11.5 | observed |
| Comparative Example 3 | 23 | slightly observed | observed | 1.2 | observed |

The invention claimed is:
1. A sheet made from a polyvinyl acetal composition, comprising:
   a polyvinyl acetal satisfying at least one of definition 1 and definition 2:
      definition 1: when 1 g of the polyvinyl acetal is dissolved in 100 g of methanol, an undissolved content of the polyvinyl acetal is 2.5 to 90% by mass with respect to 100 parts by mass of the polyvinyl acetal, and
      definition 2: when 1 g of the polyvinyl acetal is dissolved in 100 g of chloroform, an undissolved content of the polyvinyl acetal is 5% to 70% by mass with respect to 100 parts by mass of the polyvinyl acetal; and
   30 parts to 70 parts by mass of a plasticizer mixture with respect to 100 parts by mass of the polyvinyl acetal,
   wherein a content of the polyvinyl acetal in the sheet is 60.6% by mass or more;
   wherein the plasticizer mixture comprises: with respect to a total amount of the plasticizer mixture,
      0.5% to 100% by mass of a plasticizer comprising a polar group and
      0% to 99.5% by mass of a plasticizer comprising no polar group;
   wherein the plasticizer comprising a polar group comprises a polar group selected from the group consisting of a hydroxyl group, a polyethyleneoxide group having a polymerization degree of 10 or more, a polypropylene oxide group having a polymerization degree of 10 or more, a carboxyl group, and an amino group; and
   wherein the polyvinyl acetal is a polyvinyl acetal mixture of a polyvinyl acetal A and a polyvinyl acetal B having different average amounts of remaining hydroxyl groups.
2. The sheet according to claim 1, wherein the polyvinyl acetal further satisfies:
   when a solution obtained by dissolving 1 g of the polyvinyl acetal in 100 g of ethanol is titrated with hexane, a dropping amount of hexane until the solution becomes clouded is 150 mL or more.
3. The sheet according to claim 1, wherein the polyvinyl acetal further satisfies:
   when a solution obtained by dissolving 1 g of the polyvinyl acetal in 100 g of ethanol is titrated with deionized water, a dropping amount of deionized water until the solution becomes clouded is 15 mL or more.
4. The sheet according to claim 1, wherein the plasticizer comprising a polar group is a compound comprising a hydroxyl group.
5. The sheet according to claim 4, wherein the compound comprising a hydroxyl group has a molecular weight of 200 to 2000.
6. The sheet according to claim 4, wherein the compound comprising a hydroxyl group has a number average molecular weight based on a hydroxyl value calculated as follows of 200 to 2000:
   number average molecular weight based on a hydroxyl value=1000×(the number of hydroxyl groups per molecule of a compound comprising a hydroxyl group)/ ((hydroxyl value of the compound comprising a hydroxyl group)/56), where the hydroxyl value is obtained by a measurement method described in JIS K1557-1 (2007).
7. The sheet according to claim 4, wherein the compound comprising a hydroxyl group is an ester compound comprising a hydroxyl group.
8. The sheet according to claim 7, wherein the ester compound comprising a hydroxyl group is a polyester compound comprising a hydroxyl group.
9. The sheet according to claim 4, wherein the compound comprising a hydroxyl group is an ether compound comprising a hydroxyl group.
10. The sheet according to claim 9, wherein the ether compound comprising a hydroxyl group is a polyether compound comprising a hydroxyl group.
11. The sheet according to claim 1, wherein the plasticizer mixture comprises: with respect to the total amount of the plasticizer mixture,
   a compound comprising a hydroxyl group in an amount of 0.5 to 5% by mass, and
   a diester compound of a monovalent carboxylic acid; and
   at least one compound selected from the group consisting of a triethylene glycol comprising no polar group and an tetraethylene glycol comprising no polar group, in an amount of 70 to 99.5% by mass.
12. The sheet according to claim 1, wherein when the average amount of remaining hydroxyl groups of the polyvinyl acetal A is X mol % and the average amount of remaining hydroxyl groups of the polyvinyl acetal B is Y mol %, |X−Y|≥1 mol %.
13. The sheet according to claim 12, wherein:
   X=27.0 to 33.0,
   Y=15.0 to 27.0, and
   the polyvinyl acetal satisfies definition 1.
14. The sheet according to claim 12, wherein:
   X=27.0 to 33.0,
   Y=33.0 to 50.0, and
   the polyvinyl acetal satisfies definition 2.
15. The sheet according to claim 12, wherein:
   X=15.0 to 27.0,
   Y=33.0 to 50.0, and
   the polyvinyl acetal satisfies definitions 1 and 2.
16. The sheet according to claim 1, wherein the polyvinyl acetal mixture has a mixing ratio by mass of the polyvinyl acetal A and the polyvinyl acetal B of 20:80 to 98:2.
17. The sheet according to claim 1, wherein the polyvinyl acetal has an average amount of remaining hydroxyl groups of 15 to 33 mol %.
18. The sheet according to claim 1, wherein the plasticizer mixture comprises the plasticizer comprising no polar group, which comprises no polar group selected from the group consisting of a hydroxyl group, a polyethyleneoxide group having a polymerization degree of 10 or more, a polypropylene oxide group having a polymerization degree of 10 or more, a carboxyl group, and an amino group.
19. The sheet according to claim 1, wherein:
   the plasticizer comprising no polar group is a diester compound of triethylene glycol and a monovalent carboxylic acid comprising no polar group or a diester compound of tetraethylene glycol and a monovalent carboxylic acid comprising no polar group; and
   the plasticizer comprising a polar group is a compound comprising one hydroxyl group and one ester bond, and having a structure obtained by hydrolyzing either one of the two ester bonds in a diester compound.
20. A laminated glass, comprising
   the sheet according to claim 1.
21. The laminated glass according to claim 20, wherein the laminated glass has a haze value of 0.01% to 2%.

* * * * *